United States Patent [19]
Costin et al.

[11] Patent Number: 6,062,362
[45] Date of Patent: *May 16, 2000

[54] RATCHET ONE-WAY CLUTCH WITH STATOR

[75] Inventors: Daniel P. Costin, Naperville, Ill.; Duane Bacon, Saline, Mich.; Nirmal R. Pavangat, Rochester Hills, Mich.; James R. Wells, Sterling Heights, Mich.; Gerald F. Beno, Shelby Township, Mich.; Ronald F. Green, Birmingham, Mich.

[73] Assignee: Borg-Warner Automotive, Inc., Troy, Mich.

[*] Notice: This patent is subject to a terminal disclaimer.

[21] Appl. No.: 09/257,028

[22] Filed: Feb. 25, 1999

Related U.S. Application Data

[63] Continuation-in-part of application No. 08/917,880, Aug. 27, 1997, Pat. No. 5,947,245, which is a continuation-in-part of application No. 08/707,104, Sep. 3, 1996, Pat. No. 5,853,073.

[51] Int. Cl.[7] .................................................. F16D 41/069
[52] U.S. Cl. .................................................. 192/46; 192/71
[58] Field of Search ........................... 192/45.1, 46, 64, 192/71, 72, 105 CD, 105 CF, 103 B; 60/345

[56] References Cited

U.S. PATENT DOCUMENTS

| | | |
|---|---|---|
| 1,767,593 | 6/1930 | Laabs . |
| 1,883,966 | 10/1932 | Krause . |
| 2,226,247 | 12/1940 | Lesage . |
| 2,323,353 | 7/1943 | Plog . |
| 2,710,504 | 6/1955 | Dodge . |
| 3,174,586 | 3/1965 | Dotter . |
| 3,486,586 | 12/1969 | Grier . |
| 3,554,340 | 1/1971 | Shimano . |
| 5,064,037 | 11/1991 | Long, Jr. . |
| 5,065,635 | 11/1991 | Burtner et al. . |
| 5,143,189 | 9/1992 | Meier-Burkamp . |
| 5,445,255 | 8/1995 | Rutke et al. . |
| 5,449,057 | 9/1995 | Frank . |
| 5,690,202 | 11/1997 | Myers . |
| 5,855,263 | 1/1999 | Fergle . |
| 5,947,245 | 9/1999 | Costin et al. .............................. 192/46 |

FOREIGN PATENT DOCUMENTS

| | | |
|---|---|---|
| 0 471 349 A1 | 2/1992 | European Pat. Off. . |
| 2 267 464 | 11/1975 | France . |
| 139 815 C1 | 2/1901 | Germany . |
| 375 047 | 5/1923 | Germany . |
| 338693 | 3/1936 | Italy . |
| 2116 | 1/1907 | United Kingdom . |
| 1 598 908 | 9/1981 | United Kingdom . |

*Primary Examiner*—Richard M. Lorence
*Attorney, Agent, or Firm*—Artz & Artz PLC; Greg Dziegielewski

[57] ABSTRACT

A ratchet-type one-way clutch mechanism. The mechanism has an inner race member with a plurality of notches, an outer stator member with a plurality of pockets, a plurality of pawl members positioned in the pockets for engagement with the notches, and spring biasing members for biasing the pawl members toward engagement. The stator member is made from a non-ferrous material, such as aluminum or a plastic material. The pawl members have pivot ridges which mate with peaks or recesses in the pockets in the outer member to precisely position the pawls in the pockets. The centers of mass of the pawl members are selectively positioned such that the pawl members will have a tendency to become engaged or disengaged with the notches in the inner member. The spring biasing members can be Z-shaped springs, garter springs, or the like.

19 Claims, 11 Drawing Sheets

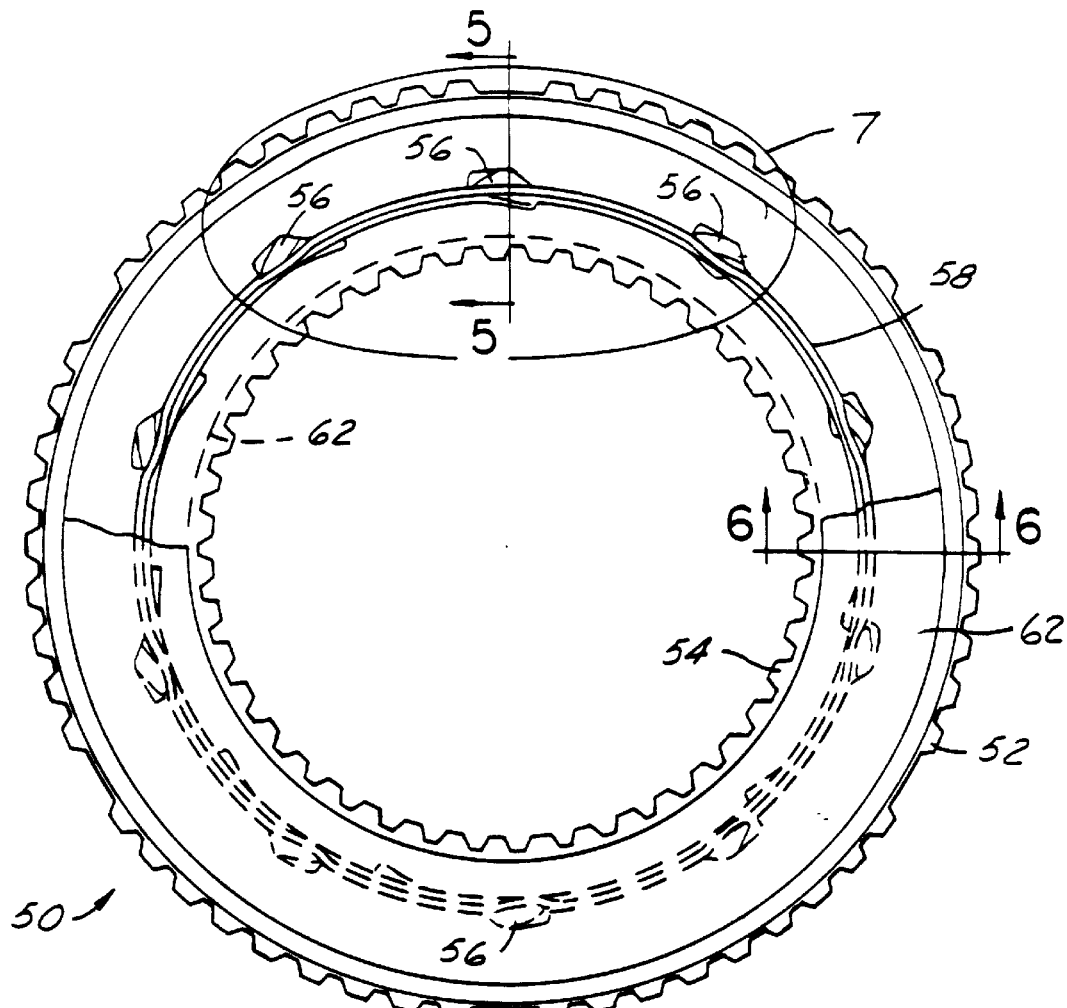
FIG.4
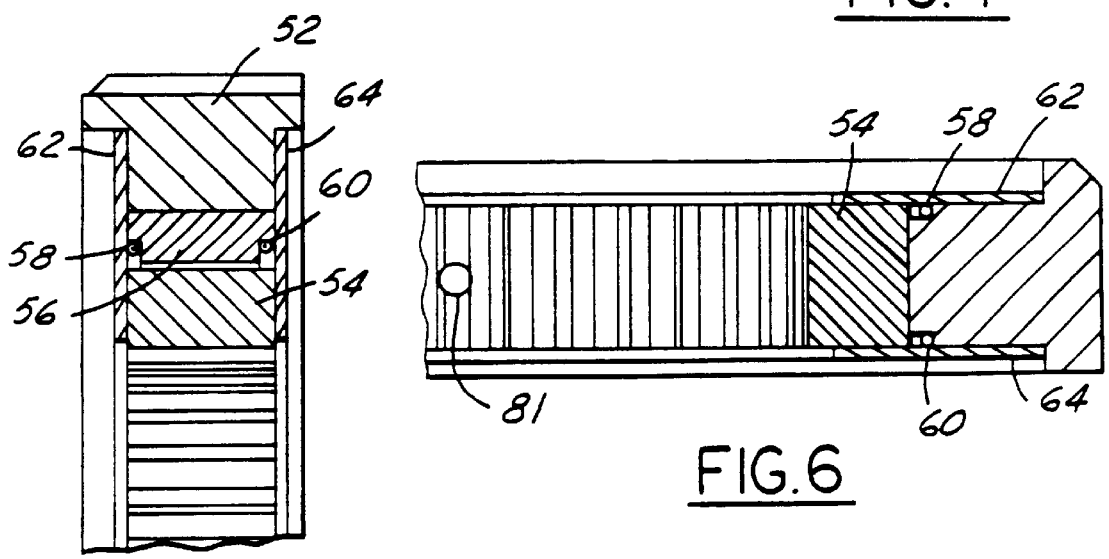
FIG.5
FIG.6

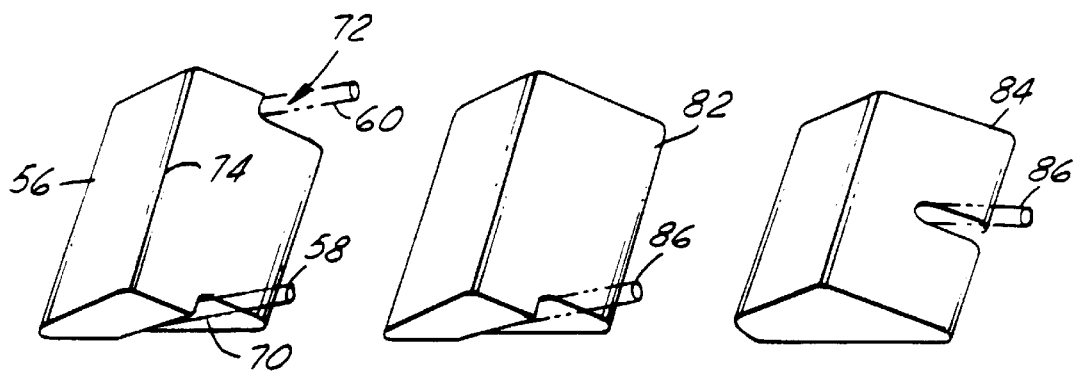
FIG. 8   FIG. 9   FIG. 10
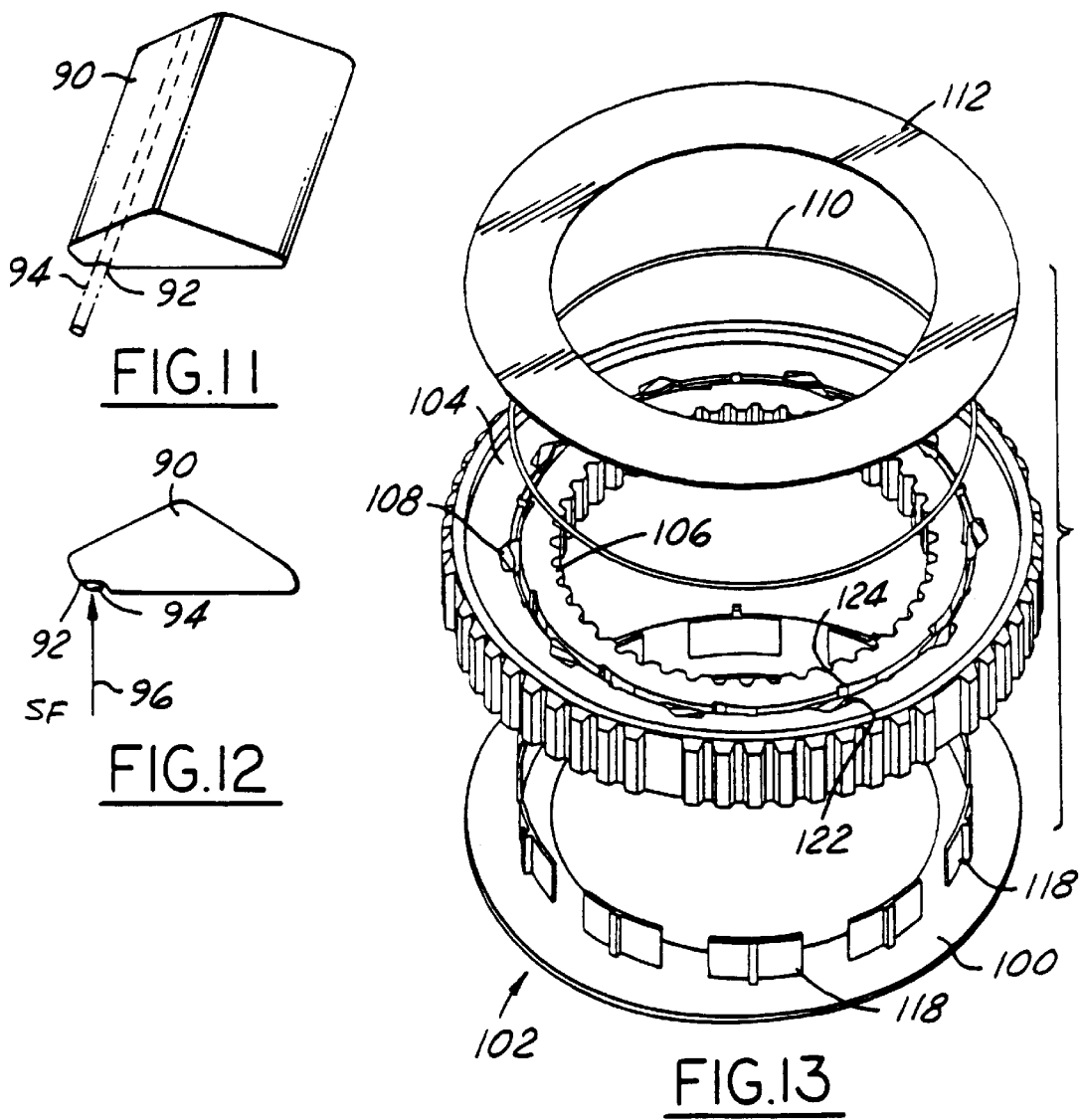
FIG. 11
FIG. 12
FIG. 13

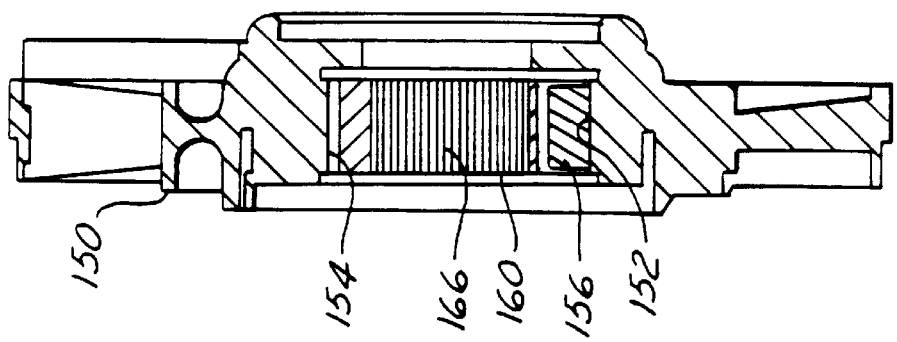
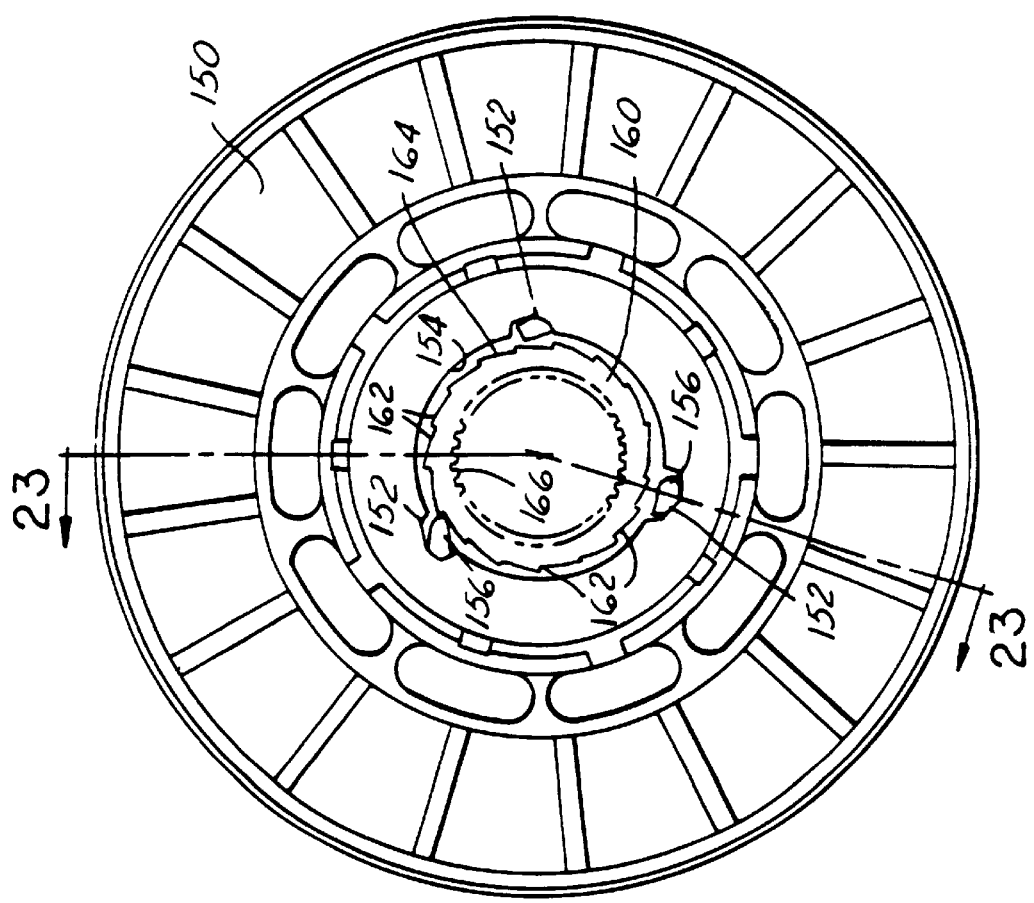

RATCHET ONE-WAY CLUTCH WITH STATOR

CROSS-REFERENCE TO RELATED APPLICATIONS

This application is a continuation-in-part of U.S. Ser. No. 08/917,880 filed on Aug. 27, 1997, now U.S. Pat. No. 5,947,245, which in turn is a continuation-in-part of U.S. Ser. No. 08/707,104 filed Sep. 3, 1996, now U.S. Pat. No. 5,853,073, both of which are assigned to the assignee of the present application and hereby incorporated by reference herein.

TECHNICAL FIELD

The invention relates to ratchet one-way clutch assemblies with stators and particularly those made with non-ferrous materials.

BACKGROUND ART

There are various types of one-way clutch assemblies in use today. Such clutch assemblies include sprag-type, roller-type, and pawl ratchet-type assemblies. All of these one-way clutch assemblies work satisfactorily depending upon the particular application in which they are used.

In certain transmissions, increased torque capacity is needed for one-way clutch assemblies. Space constraints also require that the size of the clutch assembly be retained within certain limits. Current one-way clutch assemblies with sprags or rollers are often insufficient to add increased load carrying capacity and still maintain the space constraints.

Pawl one-way clutch assemblies can add increased nominal load capacity for a given package size. The design limits of a ratchet-type pawl clutch assembly are dictated by contact stress between the pawls and the races and/or bending, shear, and hoop stresses generated within the races.

Ratchet clutch assemblies have at least one pawl which acts to lock two notched or pocketed races together in one direction and rotate freely in the other direction. In general, the differences between known ratchet clutch assemblies relate to the control of the movement of the pawls and the effect on that movement by centrifugal forces. Ratchet clutch assemblies are shown, for example, in U.S. Pat. Nos. 2,226,247, 3,554,340, and 5,449,057. Another ratchet clutch assembly is shown in British Patent No. 2116.

It is an object of the present invention to provide improved ratchet one-way clutch assemblies. It is another object of the present invention to provide improved ratchet clutch assemblies which are less expensive and lighter in weight than known assemblies, and yet are comparable in operation and performance.

It is still another object of the present invention to provide ratchet one-way clutch assemblies made of non-ferrous materials, such as plastic or aluminum, which are strong, durable and lightweight. It is a still further object of the present invention to provide ratchet one-way clutch assemblies which utilize springs to place tilting forces on the pawls toward engagement.

It is also an object of the present invention to provide ratchet one-way clutch assemblies in which the outer race members are incorporated directly into, or as part of, stator/reactor members.

SUMMARY OF THE INVENTION

The above and other objects of the invention are met by the present invention which is an improvement over known ratchet one-way clutch assemblies.

The present invention provides a ratchet one-way clutch assembly which, in the preferred embodiment, includes a plurality of pawls positioned in pockets in a stator or reactor member forming a clutch assembly. A plurality of corresponding toothed notches are positioned on the outer circumference of an inner race member to mate with the pawls in locking engagement during relative rotation of the stators and inner race member in one direction. The notches contain teeth on the outside of the race member which are shaped to prevent rotation of the stator in one direction, but allow freewheeling rotation in the opposite direction. The inside diameter of the inner race member is adapted to mate with and be securely positioned to a support shaft, such as a stationary support shaft of a vehicle transmission.

The pawls have peaks or ridges which mate with pivot ridges or recesses in the pockets in the stator members. In the preferred embodiment, the center of mass of the pawls is situated or positioned such that when the clutch rotates the centrifugal force on the center of mass causes the pawl to move toward the disengaged position.

Spring members are positioned in the stator and adapted to engage the pawls and cause them to be biased in the direction of engagement with the notches in the inner race member. Although various types of spring mechanisms can be used to perform this function, preferably the spring members are wide Z-shaped springs which extend the width of the pawl members.

Preferably, the stator member is made of a non-ferrous material which is lighter in weight than materials conventionally used for clutch assemblies, particularly the outer race members. The non-ferrous material can be a metal material, such as aluminum, or a plastic material, such as polyethylene, which meet the durability and strength standards necessary for the application of the clutch assembly.

The ridge in the outer race pocket is located relative to the center of mass of the pawls in order to control the engaging force. This is necessary for high speed durability. In this regard, it is possible in accordance with an alternate embodiment of the invention to position the center of mass such that the pawl is urged toward the engaged position, or even a "neutral position" neither engaged or disengaged.

Other spring members which can be used with the present invention include garter springs, coil springs and ribbon springs. The spring forces can be applied on a center groove or on one or more side grooves in the pawl members, or the spring forces can act on the pawl members themselves, or in recesses that extend axially along the length of the pawl.

Other embodiments of the invention utilize one or more axial retainment devices. These devices include pairs of washers, or plastic retainers with axial extending flange members. The devices retain the pawls axially and also hold the races in axial radial alignment, while allowing relative rotation. The retainment devices also act as thrust bearings and can retain required lubrication to prevent excessive wear of the pawls.

By eliminating the outer race members of clutch assemblies and incorporating the pawl pockets directly in a stator or reactor mechanism, or other similar member, expenses in materials and manufacturing procedures are reduced. Similarly, the inner race member can be eliminated and the notches incorporated directly into a central shaft member or the like. Again, this could cause savings in materials, manufacturing time and expense.

The present inventive ratchet one-way clutch assembly has particular use in vehicle transmissions and can be used in environments where both races rotate or where one of the races is fixed. The invention can also be used in any mechanism where a positive backstop is desired to prevent undesired reverse or backward rotation, such as in an escalator mechanism or the like.

Other features, benefits and advantages of the present invention will become apparent from the following description of the invention, when viewed in accordance with the attached drawings and appended claims.

BRIEF DESCRIPTION OF THE DRAWINGS

FIGS. 3 and 4 illustrate an alternate embodiment of the present invention which utilizes spring members, with FIG. 4 being an elevational view and FIG. 3 being an exploded view thereof;

FIGS. 5 and 6 show partial cross-sectional views of the embodiment shown in FIG. 4, the cross-sectional views being taken along lines 5—5 and 6—6, respectively, in FIG. 4 and in the direction of the arrows;

FIGS. 8, 9 and 10 illustrate various embodiments of pawl members for use with a first spring-type embodiment of the present invention;

FIGS. 11 and 12 illustrate an embodiment of pawl members for use with a second spring-type embodiment of the present invention;

FIGS. 13 and 14 illustrate a still further embodiment of the present invention, with FIG. 14 being an elevational view and FIG. 13 being an exploded view thereof;

FIG. 22 illustrates a preferred embodiment of the invention wherein the pawl pockets are incorporated directly in a stator/reactor assembly;

FIG. 23 is a cross-sectional view of the assembly of FIG. 22, the cross-sectional view being taken along line 23—23 in FIG. 22 and in the direction of the arrows;

BEST MODE(S) FOR CARRYING OUT THE INVENTION

Figure 1:
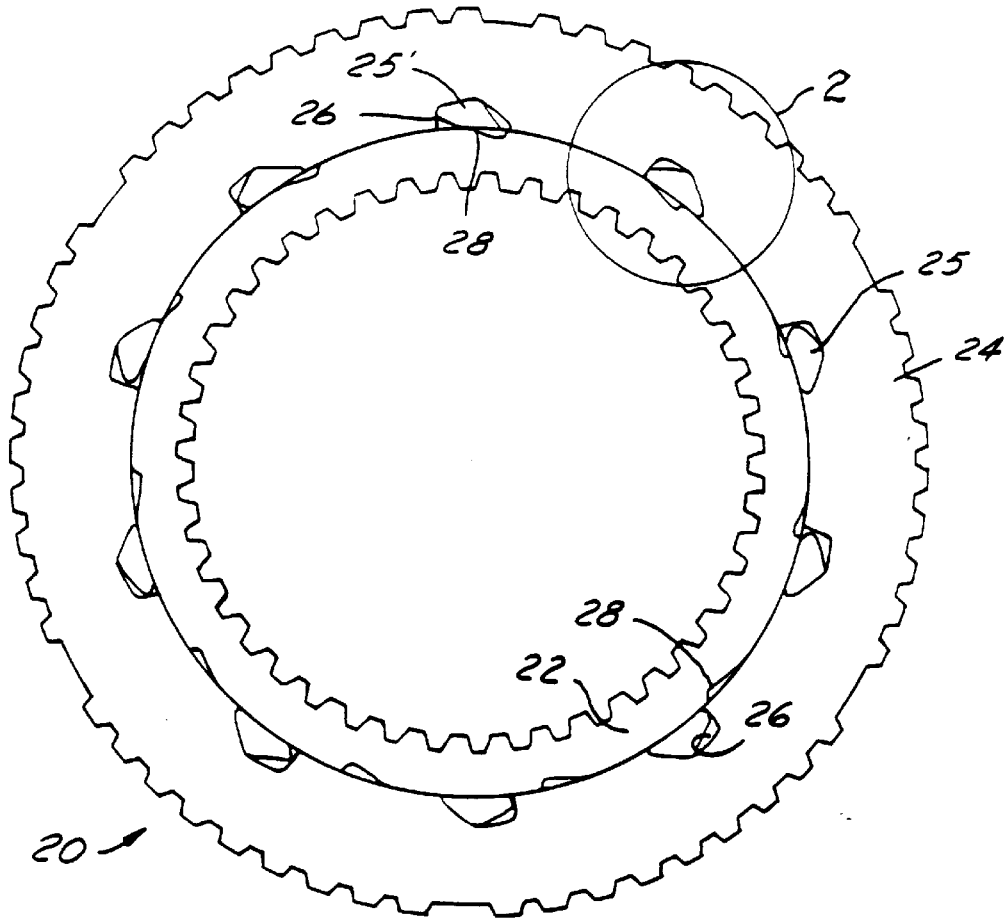
FIG. 1 illustrates a ratchet one-way clutch assembly in accordance with one embodiment of the present invention.

FIG. 1 schematically illustrates one type of a ratchet one-way clutch assembly 20. The assembly 20 includes an inner race member 22, an outer race member 24, and a plurality of individual pawl members 25. The pawl members 25 are positioned in pockets 26 in the outer race member. A plurality of notches 28 are positioned in the outer circumference or periphery of the inner race member 22. The notches provide teeth which are shaped to prevent rotation of the two races relative to one another in one direction, but allow rotation in the other direction.

When the motion of the inner race member 22 relative to the outer race member 24 is in the clockwise direction in FIG. 1, the inner race rotates freely. When the relative motion of the inner race member 22. relative to the outer race member 24 is counter-clockwise, the inner race and outer race are locked together by one of the pawls 25. In this regard, in FIG. 1, the locked pawl member is indicated by the reference numeral 25'. The pawl 25' transmits force through pocket 26 in the outer race and notch 28 in the inner race.

In the clutch assembly shown in FIG. 1, ten pockets 26 and ten pawl members 25 are shown, together with eleven notches 28 in the inner race 22. Although the embodiment shown in FIG. 1 only shows one pawl 25' in engagement, more than one pawl member can be engaged at one time depending on the relative number and location of the pawls and notches, as well as manufacturing tolerances. Mathematically, more than one pawl member can be engaged if the number of pawls and notches are both wholly divisible by a common denominator other than one.

Figure 2:
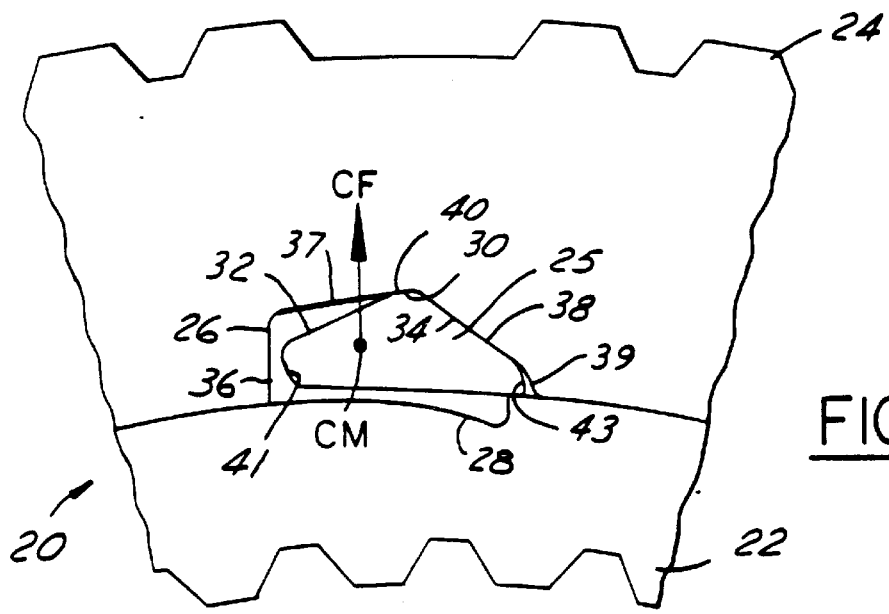
FIG. 2 is an enlarged view of a portion of the clutch assembly shown in FIG. 1.
Figure 3:
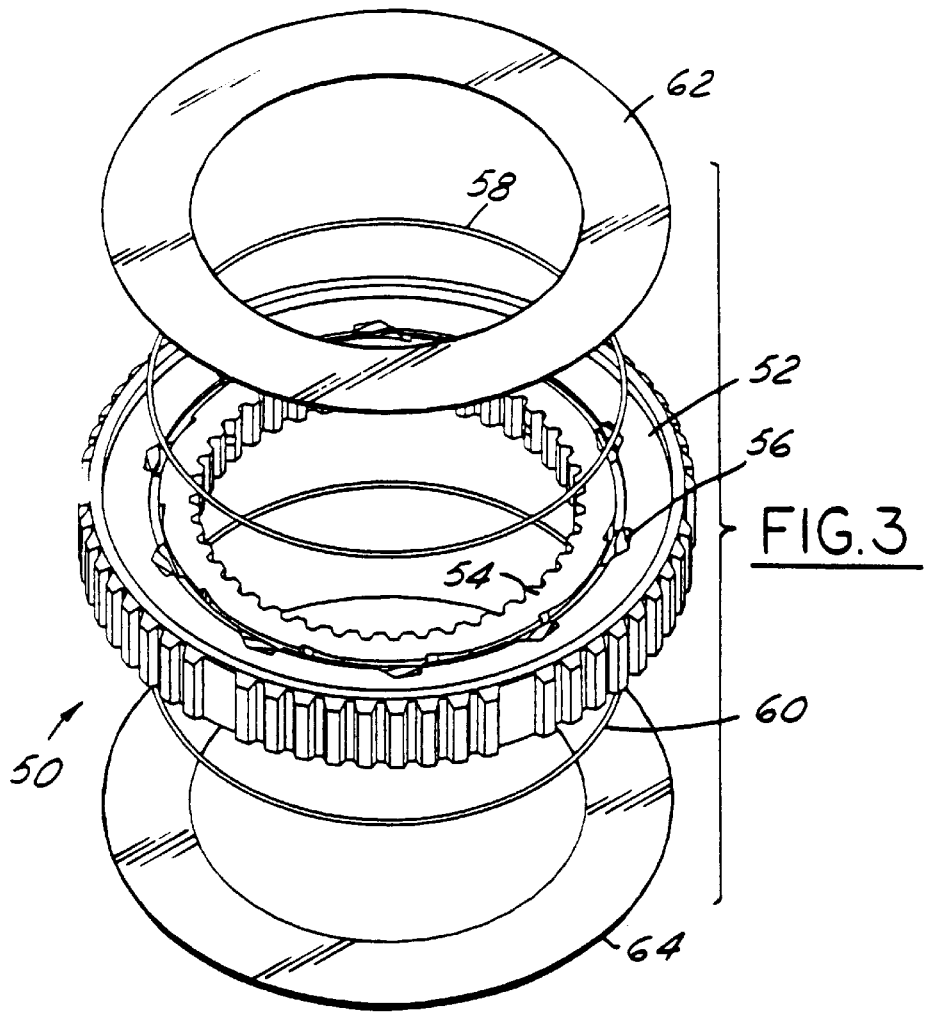

FIG. 2 is an enlarged view of a portion of the clutch assembly shown in FIG. 1. The pawl member 25 shown in FIG. 2 is depicted in the free-wheeling position. In accordance with the present invention, the cross-section of the pawl 25 has a peak or pivot ridge 30 formed by the intersection of two substantially flat sides 32 and 34. The peak 30 of the cross-section forms a pivot ridge with the outer race pocket 26 which is shaped to receive the pawl member. In this regard, the pocket 26 has substantially straight sides 36, 37, 38 and 39.

In accordance with the embodiment shown in FIG. 2, the center of mass (CM) of the pawl member 25 is positioned to the left of the pivot ridge 30. In this manner, as the clutch assembly 20 rotates, a centrifugal force (CF) on the center of mass (CM) causes the pawl 25 to move toward the engaged position, that is, the position where it would be engaged with notch 28 in the inner race 22. The torque on the pawl member 25 is proportional to the tangential distance of the CM away from the ridge 30.

Although the embodiment of the invention shown in FIGS. 1 and 2 shows a pawl member with the center of mass positioned, together with the pocket in the outer race, such that the pawl has a tendency to move toward the engaged position, other embodiments can be utilized in accordance with the present invention. For example, the geometry of the pawl can be changed to provide a pawl with a disengaging tendency. In this manner, the CM could be positioned to the right of the pivot ridge 30.

The pocket 26 in the outer race also has a peak or recess 40 which mates with the pivot ridge 30 of the pawl member 25. The peak 40 in the pocket holds the pawl 25 in the proper circumferential location for free movement in the pocket. This prevents the ends 41 and 43 of the pawl member 25 from coming in contact with the sides 36 and 39, respectively, of the pocket. If the ends of the pawl were to contact the adjacent areas of the outer race pocket, friction could slow the movement of the pawl toward engagement. Preferably, it is desirable for the pawls to rotate into engagement with the inner race member as quickly as possible.

With the present invention, the ridge on the pawl is precisely located relative to the center of mass of the pawl, regardless of the exact location of the pawl with respect to the outer race. This allows precise control of the engaging force, which is preferred for high speed operation. This is also accomplished with a relatively simple geometry which does not include an axle, separate pivot member, or the like. Moreover, the outer race pocket is shaped such that it also has a corresponding peak or recess, which retains the pawl in a precise location in the pocket. This location prevents the pawl from contacting the sides or ends of the pocket as it rotates toward engagement.

Preferably, the pawl members 25 are made of a hardened steel material and formed by pieces cut from a drawn wire. This allows precise control of the geometry of the pawl, and also allows precise control of the center of mass relative to the peak or pivot ridge 30. In this regard, with the present invention, it is possible to control the center of mass within a tolerance of 0.001 inches.

Another embodiment of a one-way clutch mechanism is shown in FIGS. 3–8. This embodiment is referred to generally by the reference numeral 50 in the drawings. In the one-way ratchet clutch assembly 50, a spring is used to provide a tilting force on the pawl members toward engagement. A spring is particularly needed for pawls which are disengaged centrifugally, as well as for engaging pawls that must engage when the outer race is stationary. In FIGS. 3–8, the assembly 50 includes an outer race member 52, an inner race member 54, a plurality of pawl members 56, and a pair of garter springs 58 and 60. A pair of retainment washers 62 and 64 are also provided in the embodiment shown in FIG. 3 and are discussed further below.

Figure 7:
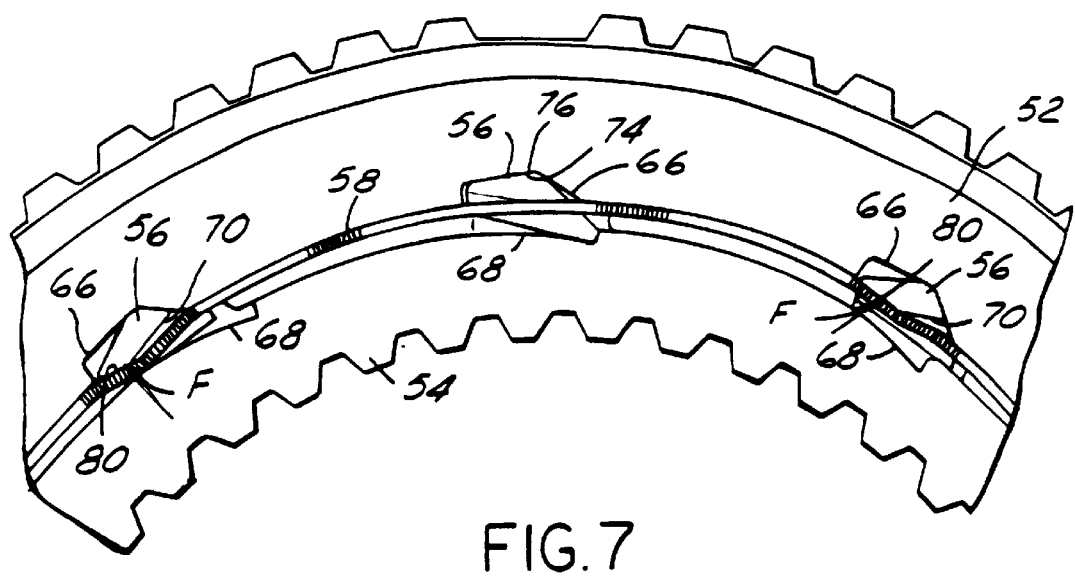
FIG. 7 is an enlarged view of a portion of the clutch assembly embodiment shown in FIG. 4.
Figure 14:
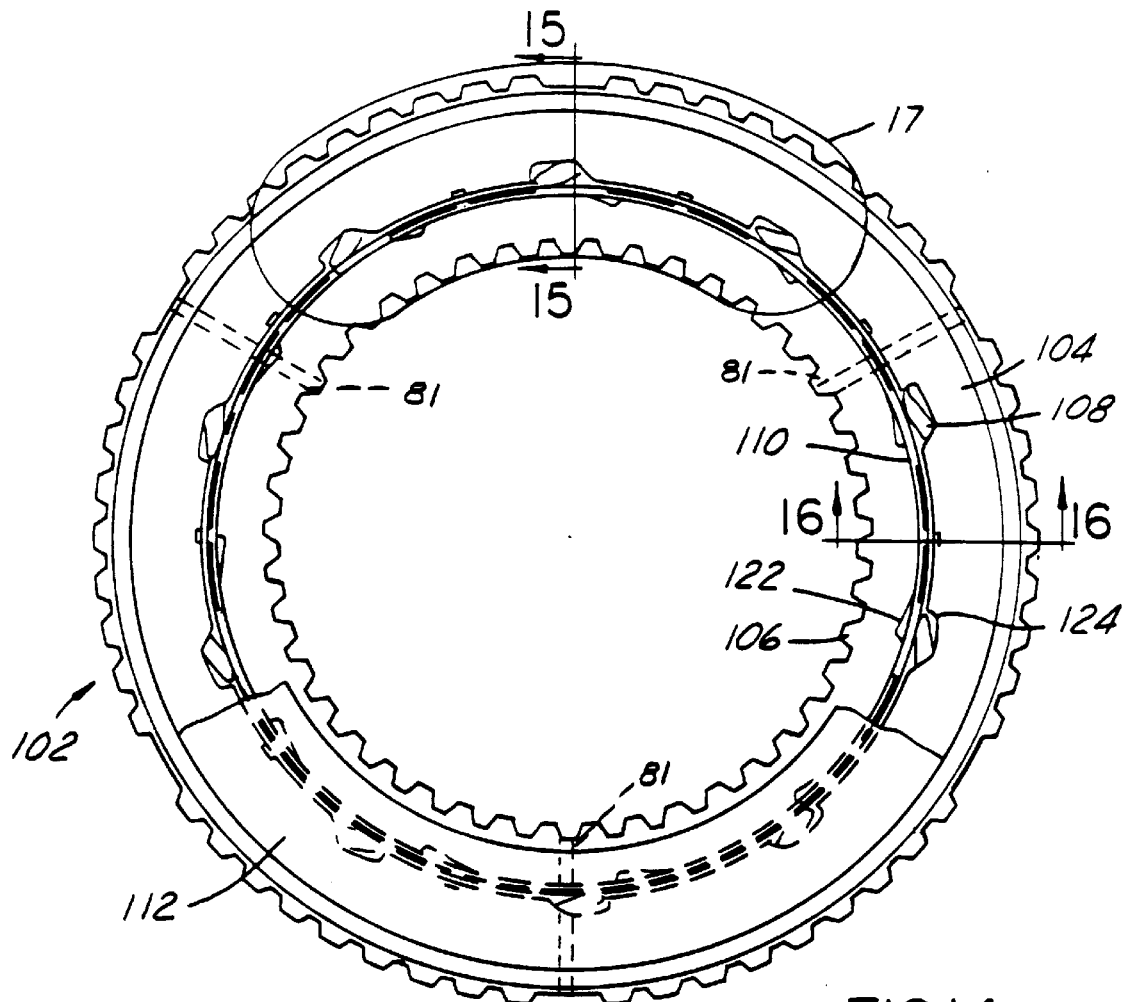
Figures 15, 16:
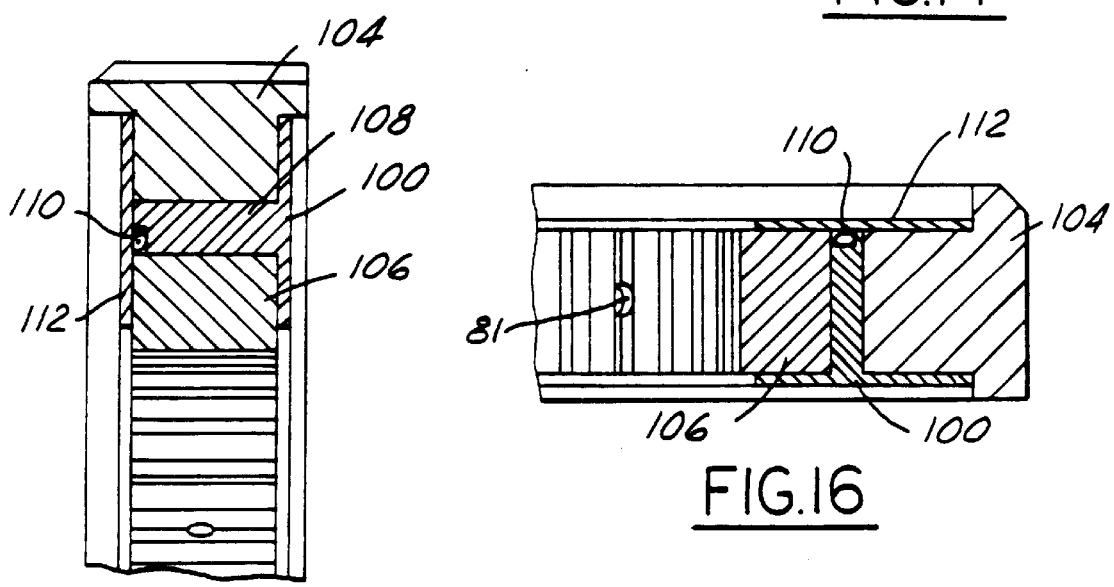
FIGS. 15 and 16 show partial cross-sectional views of the clutch assembly shown in FIG. 14, the cross-sectional views being taken along lines 15—15 and 16—16, respectively, in FIG. 14 and in the direction of the arrows.
Figure 17:
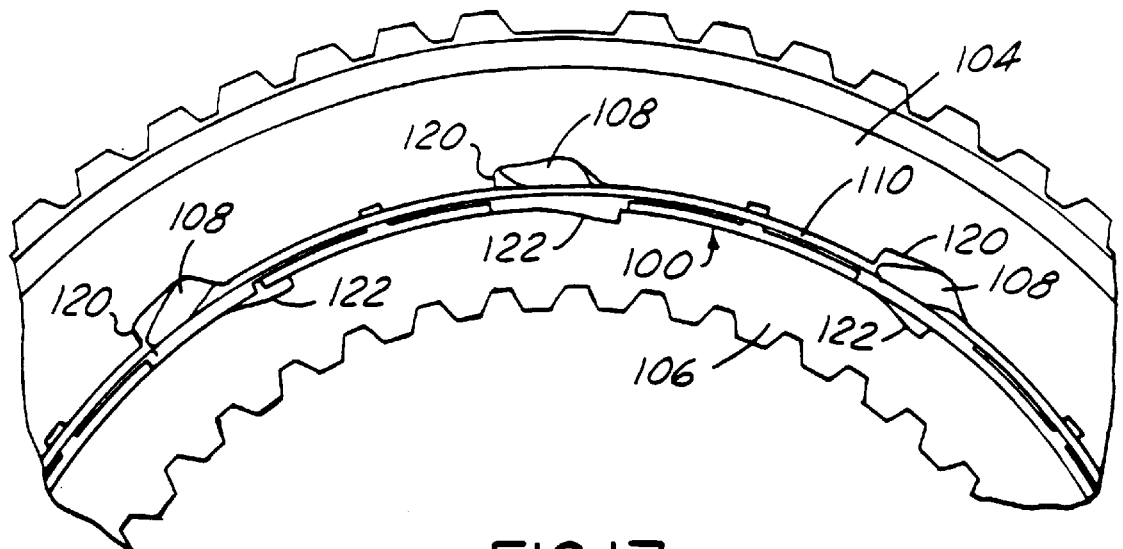
FIG. 17 is an enlarged view of a portion of the clutch assembly embodiment shown in FIG. 14.

As shown more particularly in FIG. 7, the pawl members 56 are positioned in pockets 66 in the outer race members 52 and are adapted to engage with notches 68 in the inner race 54. The garter springs 58 and 60, only one of which is shown in FIG. 7, are made from a small coil of wire and are commonly available. For the embodiment shown in FIG. 3 which utilizes two garter springs 58 and 60, pawl member 56 is utilized as shown in FIG. 8. The pawl member 56 has a pair of recesses or side grooves 70 and 72. The garter springs 58 and 60 are positioned in the grooves 70 and 72 when the pawl members are positioned in the outer race. The remainder of the pawl members 56 have sizes and shapes similar to pawl members 25 described above with respect to FIGS. 1 and 2. In this regard, the pawl members have a pivot ridge 74 which mates with a peak or recess 76 in the pocket 66.

The operation of the spring members 58 and 60 is shown with reference to spring 58 and pawl members 56 in FIG. 7. In this regard, when the pawl members are in their disengaged position, the garter spring 58 provides a force toward outer race member and thus toward the engaging position of the pawl member. This spring provides a force F (as shown in FIG. 7) against surface 80 of each of the pawl members. When the pawl members 56 are in their engaged positions, that is mated with notches 68 in the inner race, the spring member 58 is relaxed and does not provide a spring force on the pawl members. This is shown with respect to the center pawl member 56 in FIG. 7.

The spring force can also be arranged to act on a single side groove or a center groove of the pawl geometry. This is shown in FIGS. 9 and 10 where the pawl members are referred to by the reference numbers 82 and 84, respectively. The garter spring is indicated in phantom lines and is referred to by reference numeral 86. If either of the pawl embodiments shown in FIGS. 9 and 10 are utilized with the embodiment of the invention shown in FIGS. 3–7, then the position of the garter spring and the number of garter springs provided is adjusted accordingly.

Opening or aperture 81 in the inner race 54 (FIG. 6) provides an access hole for lubrication relative to the transmission or other mechanism in which the one-way clutch assembly 50 is utilized. Preferably, several access holes are provided in the clutch assembly.

The spring force on the pawl members can also be applied in another manner. As shown in FIGS. 11 and 12, the pawl member 90 has a longitudinally or axially extending groove 92. A small ribbon spring 94 is utilized to provide a spring force (SF) in the direction of arrow 96. The ribbon springs 94 are preferably thin strips of spring steel material and are positioned in the grooves 92 in order to provide a force SF toward engagement of the pawl members 90.

The washers 62 and 64, as shown in FIGS. 3–6, are also known as axial retainment devices or members and can be used to improve or enhance the operation of the present invention. The members 62 and 64 retain the pawl members axially (longitudinally) in the clutch assemblies. The retainment members also hold the inner and outer races in axial alignment, while allowing free relative rotation. Moreover, the axial retainment members act as thrust bearings between the clutch assembly and external parts of the mechanism that are rotating relative to the clutch assembly and must carry an axial load through the assembly. Finally, the axial retainment members (washers) 62 and 64 can retain lubrication in the clutch assembly which is required to prevent excess wear of the pawl members.

The washers 62 and 64 can be connected to the outer race through a press-fit arrangement, staking, welding, or mechanical fastening in any conventional manner.

An injection molded plastic retainer member can also be utilized. Such a member 100 is shown in FIGS. 13–17. In these Figures, the one-way ratchet clutch assembly is referred to generally by the reference numeral 102. Together with the retainer member 100, the assembly 102 includes an outer race member 104, an inner race member 106, a plurality of pawl members 108, a garter spring member 110 and a second retainment member 112.

In this regard, in the embodiment shown in FIGS. 13–17, the pawl members 108 can be of any of the types shown and described herein. In addition, the pawl members 108 are contained in pockets 122 in the outer race member and engage notches 124 in the inner race member, in the same manner described above with reference to FIGS. 1–12.

The retaining member 100 has a plurality of flanges or upstanding arcuate-shaped guide members 118 situated to be positioned within the annular space between the inner and outer races 106 and 104, respectively. The member 100 is a radial bearing retainer for the pawls and the race members, and also acts as a lube dam for lubrication. The retainer members 100 and 112 are preferably attached together to retain the clutch assembly together axially. The retainer members also act as thrust bearings between the assembly and external parts of the mechanism that are rotating relative to the clutch assembly and carry axial loads through the assembly. Preferably, the retainer member 100 is made from an injection molded plastic material, and also preferably has a low friction coefficient so that it can provide improved bearing performance over regular steel-on-steel bearings. The retainer members 100 and 112 can be connected together in any conventional manner, such as a press-fit arrangement, staking, ultrasonic welding, mechanical fastening, and the like.

Figure 18:
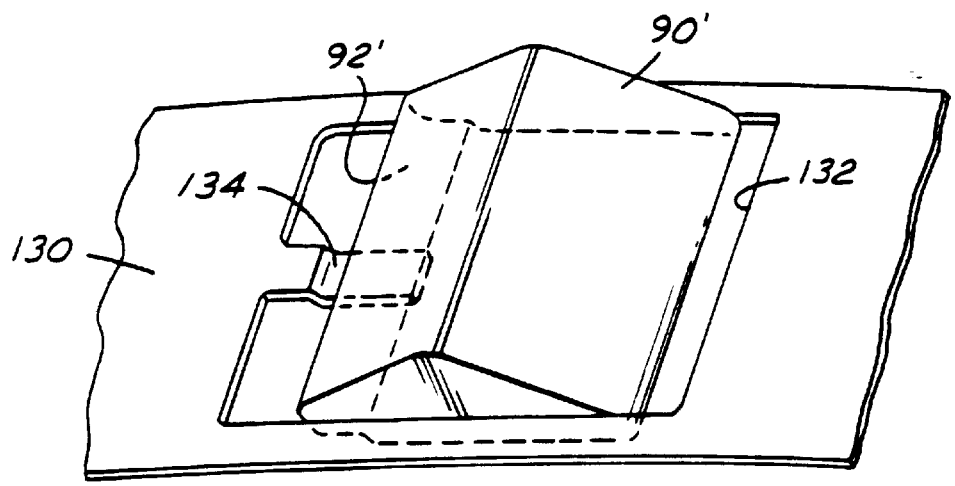
FIGS. 18 and 19 depict another ribbon spring embodiment of the present invention.
Figure 19:
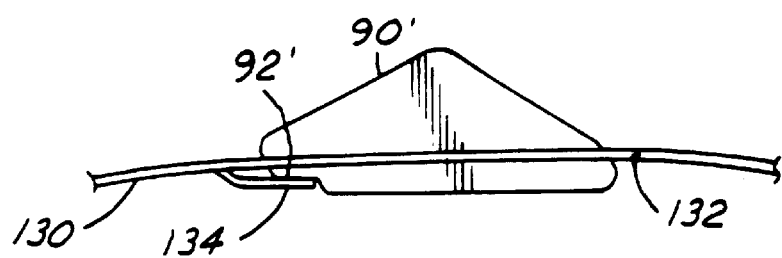

Another ribbon spring embodiment in accordance with the present invention is shown in FIGS. 18 and 19. In this embodiment, pawl members 90' are utilized which are the same as pawl members 90 described earlier, and have an axial groove 92'. A ribbon spring member 130 has an annular circular shape and is adapted to fit between the inner and outer race members of the clutch assembly. The spring member 130 is preferably made of spring steel and has a plurality of openings or windows 132 (only one of which is shown), each with a tab member 134. The pawl members 90' are positioned in the openings 132 and the tab members are positioned in the grooves 92'. The ribbon spring member 130 through the tab member 134 provides a biasing force on the pawl members 90' toward engagement with the notches on the inner race member. Also, although the tab member 134 illustrated in FIG. 18 only covers a small part of the width of the window 132 and the width of pawl 90', it is to be understood that tabs can be provided on the spring member 130 which extend most or entirely across the width of the window and pawl member.

Figure 20:
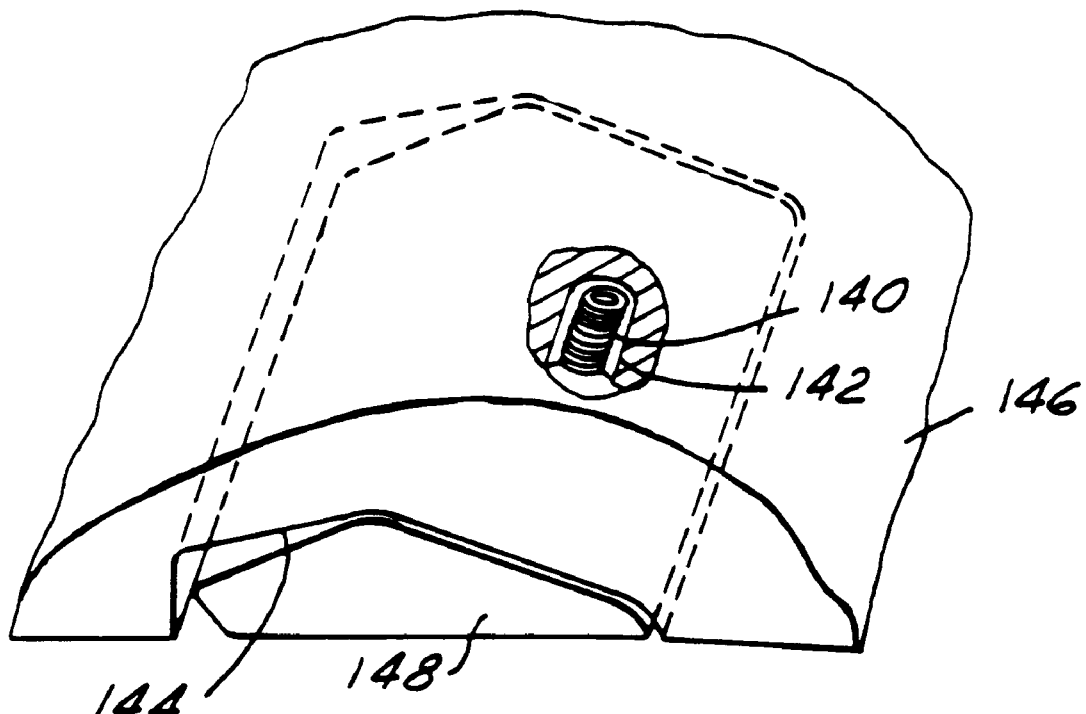
FIGS. 20 and 21 depict a coil spring embodiment in accordance with the present invention.
Figure 21:
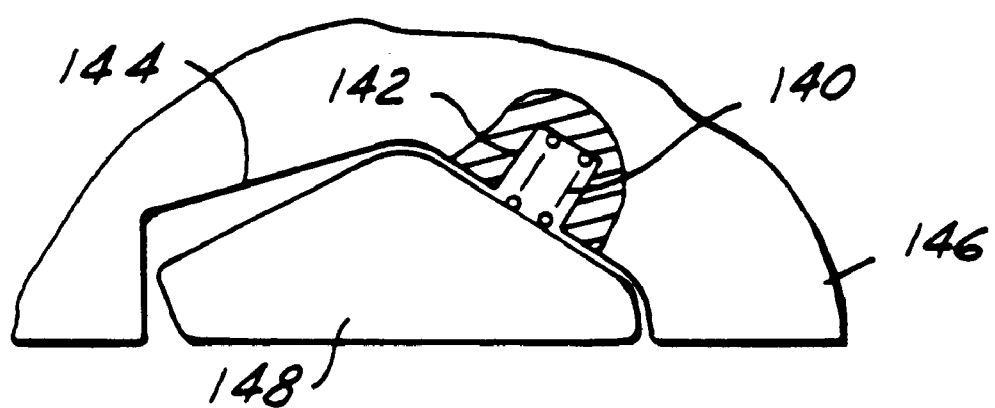

In accordance with the spirit and scope of the present invention, the spring mechanism for biasing the pawl members toward engagement with the inner race notches can have a wide variety of forms. Other than garter and ribbon springs described above, other spring members, such as coil springs, leaf spring, and the like could be utilized and fall within the scope of the present invention. For example, in this regard, a coil spring embodiment is shown in FIGS. 20 and 21. One or more coil springs 140 are positioned in recesses or bores 142 which connect to pockets 144 in the outer race member 146. The coil springs 140 bias the pawl members 148 radially inwardly toward the inner race member.

Alternate embodiments for use with the present invention are shown in FIGS. 22–28. These embodiments can provide improved economies in cost, manufacture and assembly procedures, as well as improved performance.

As shown in FIGS. 22–23, the pawl pocket members are incorporated directly as part of a stator or reactor member 150 for a torque converter or the like. The member 150 can be any integral part which would require a one-way clutch mechanism. Preferably, the member 150 is made from an aluminum, plastic or another material which can be cast and machined relatively easily. A plurality of pocket members 152 are formed and/or machined directly into the inner diameter surface 154 of the member 150. The pawl members 156, which are positioned in the pockets 152, can be of any of the types shown and described herein, and can be urged toward the engaged position by predetermined positioning of the center of mass CM, or by one of the various types of spring members or mechanisms, all as discussed herein.

Figure 27:
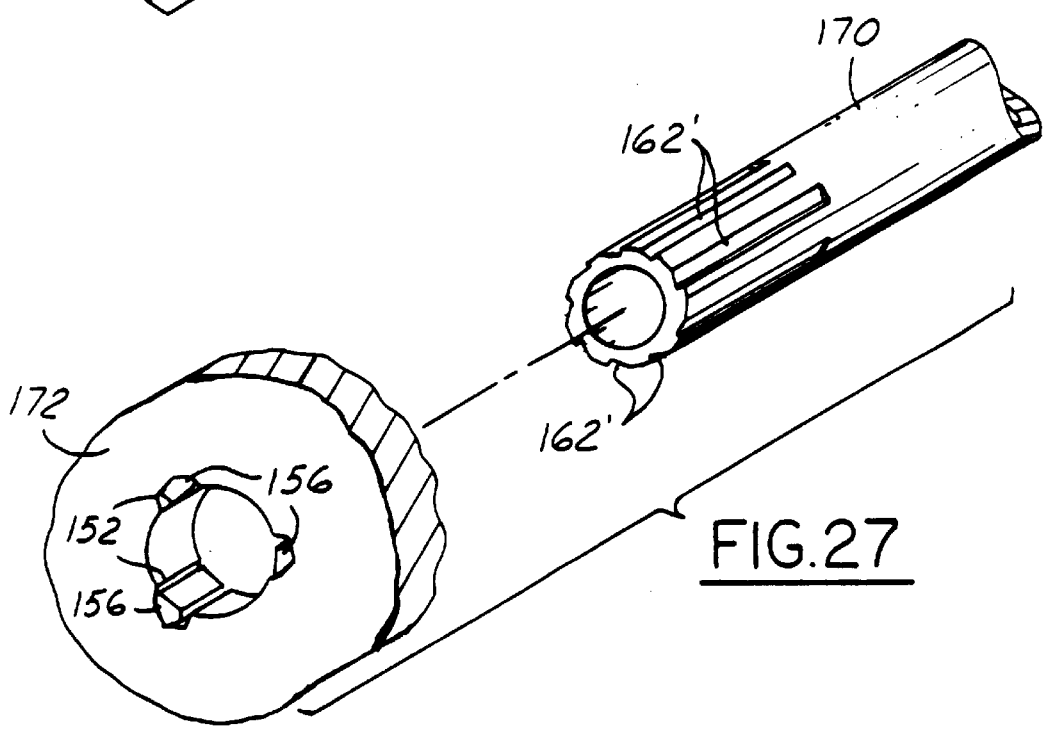
FIG. 27 illustrates an embodiment of the present invention wherein the engaging notches for the pawl members are incorporated directly on a shaft member.

The inner member 160 can be any typical inner race member of the type discussed above with a plurality of locking notches 162 positioned around its outer circumference 164. Alternatively, the central shaft member which typically mates with the inner race member by mating teeth or spline members 166 or the like, can have the notches machined or formed directly on the outer circumference of the shaft, thereby eliminating the inner race member. Such an embodiment is shown in FIG. 27 wherein a plurality of notches 162' are provided on shaft member 170, which typically is hollow, and the shaft member is then mated with member 172 which can be an outer race member, a stator or reactor member, or the like. Shaft member 170 can be, for example, part of a vehicle transmission.

Any number of pockets and notches can be provided as desired by the clutch designer and/or in accordance with the operating specifications and parameters for the clutch mechanism. In the embodiment shown in FIGS. 22–23, three pockets and pawl members are provided and uniformly spaced around the inner circumference/diameter of the outer member 150. In order to effectively and efficiently mate with this number of pawl members and to allow the clutch mechanism to lock-up in the desired time with limited backlash (e.g. twelve degrees), preferably ten notches are provided in the inner member.

Figure 24:
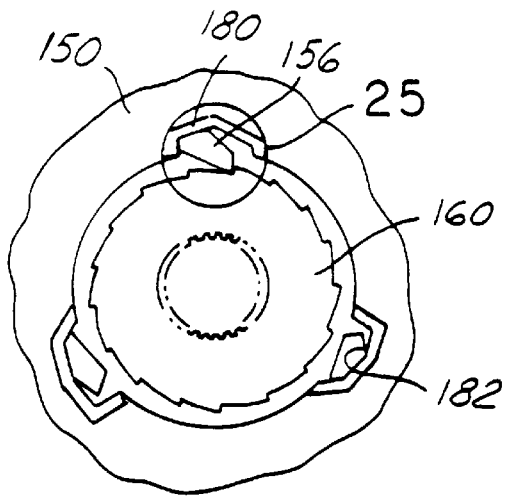
FIG. 24 shows an alternate embodiment of the assembly shown in FIGS. 22–23.
Figure 25:
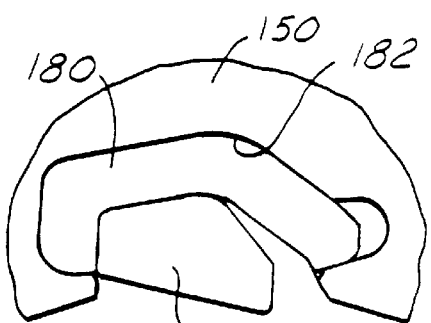
FIG. 25 is an enlarged view of a portion of the assembly shown in FIG. 24.
Figure 26:
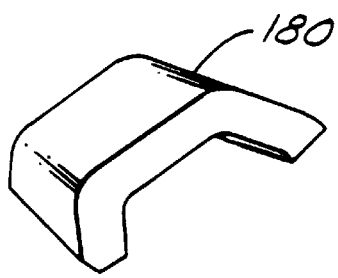
FIG. 26 is a perspective view of the reinforcing members utilized in the embodiment shown in FIGS. 24–25.

FIGS. 24–26 depict an alternate embodiment of the invention in which insert members 180 are provided. The insert members 180 are made from steel or another hard or hardened material and are used to prevent damage to softer materials which might be utilized for the outer stator, reactor or other member 150 when the clutch mechanism is utilized. The inserts can be made of stamped steel or the like.

The pocket members 182 in the member 150 are provided with a larger space or area to allow positioning of the insert members 180 therein. The insert members are press fit, swaged or otherwise permanently secured in the pockets 182. The pawl members 156 are positioned inside the cupped insert members as shown.

Figure 28:
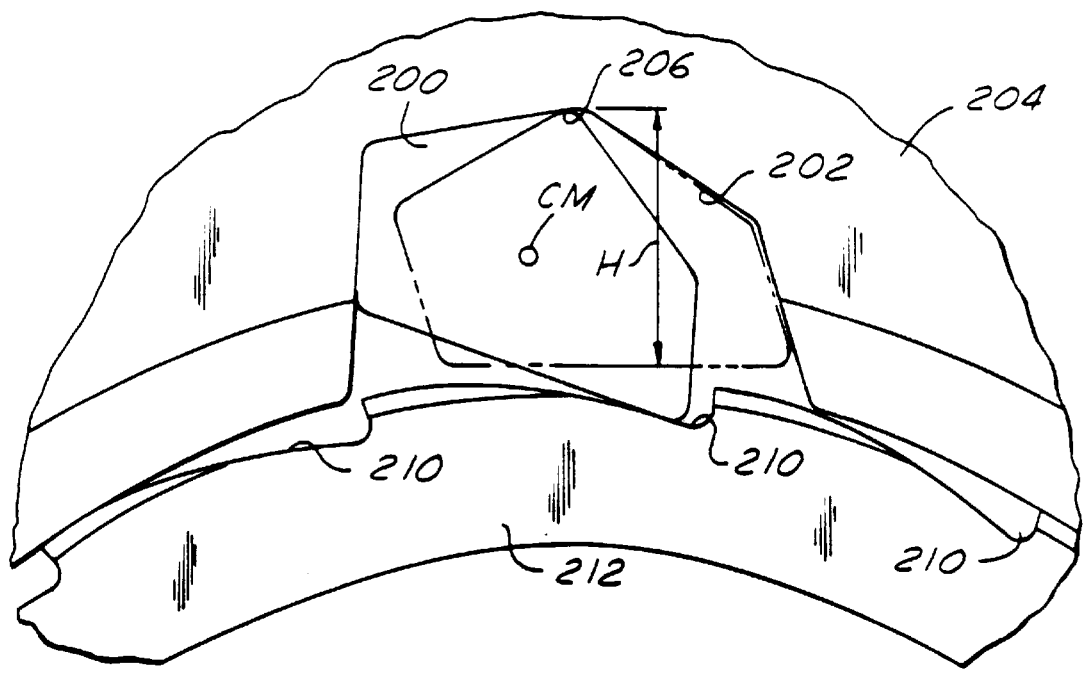
FIG. 28 illustrates other embodiments of pawl and pocket members for use with the present invention.

Another embodiment of the pawl member which can be utilized with the present invention is shown in FIG. 28. In this embodiment, the pawl member 200 has a different size and proportions from the pawl members shown above. In particular, the pawl members 200 have a greater height H in the radial direction. This increases the load-carrying capacity of the clutch mechanism.

As with the other embodiments presented above, the pawl member 200 is positioned in a pocket 202 in an outer member 204, which can be an outer race, a stator or reactor, or the like. The center of mass CM of the pawl member 200 can be positioned as shown relative to the peak or pivot ridge 206, such that a pawl engaging force is generated upon rotation of the outer member 204. Similarly, a plurality of notches 210 are formed in the inner member 212, which can be an inner race, a shaft member, or the like.

It is also possible to utilize one of the spring members or mechanisms of the types and embodiments discussed above in order to assist in providing a tilting force on the pawl members 200 toward engagement. The use of retainment washers or thrust bearings on one or more sides of the ratchet one-way clutch mechanism shown in FIG. 28 could also be provided. Appropriate lubrication channels and openings could further be provided as are conventionally utilized in the clutch art.

Figure 29:
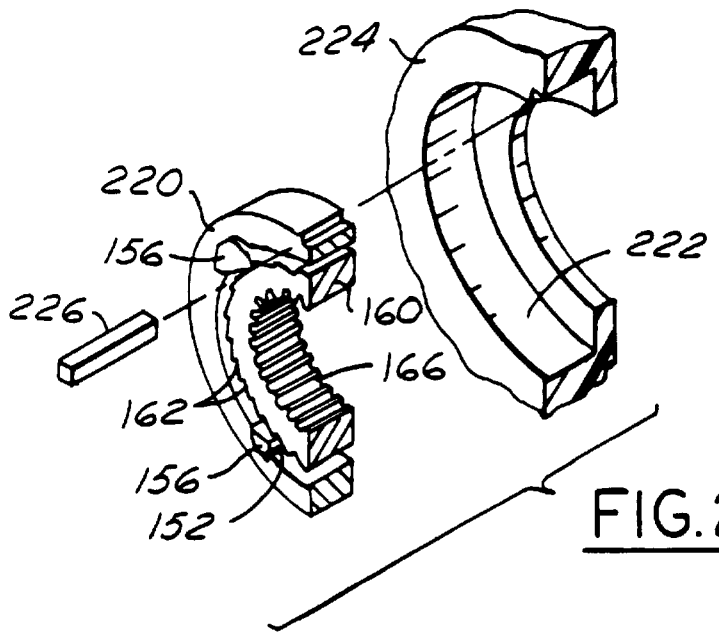
FIG. 29 depicts still another alternate embodiment of the invention.

As an additional embodiment, it is also possible to provide the outer member as an insert which is combined with a stator, reactor or other mechanical member. This is shown in FIG. 29. The outer member 220 has an annular shape and is adapted to fit within cavity or recess 222 in the stator, reactor or other member 224. The outer member 220, which preferably is made from a metal material, can be press fit or keyed by key member 226 into the member 224. In this manner, the member 224 can be made from a lower cost material, such as a plastic material. The other portion of the clutch mechanism, including the inner member 160, pawl members 156 and the like are the same as those set forth above.

Figure 30:
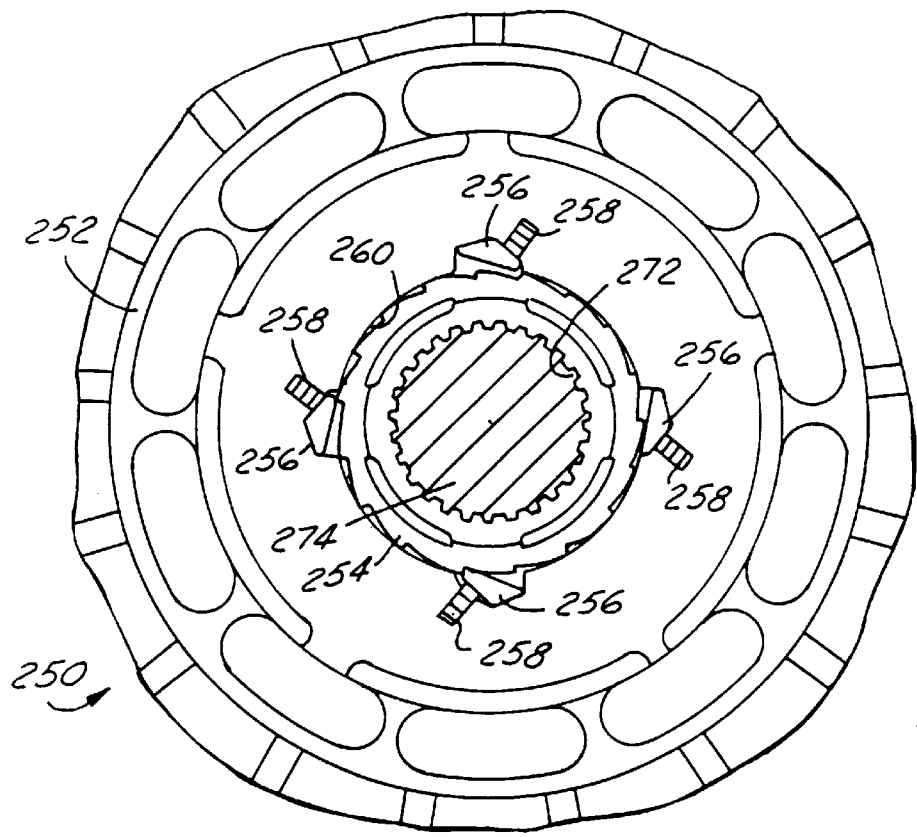
FIGS. 30–32 depict the presently preferred embodiment of the invention.
Figure 31:
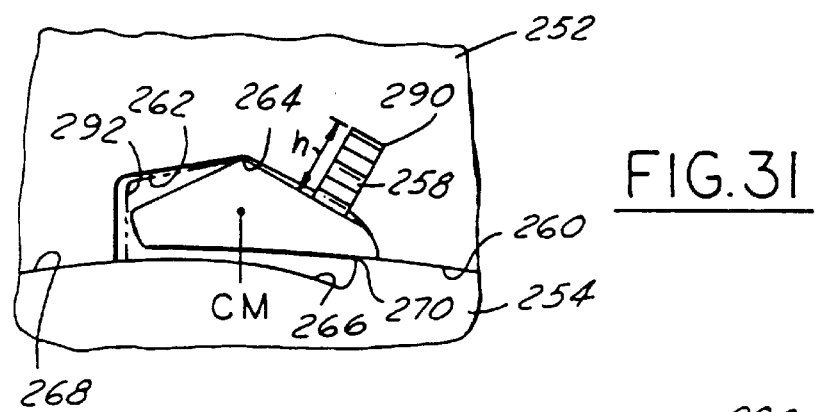
Figure 32:
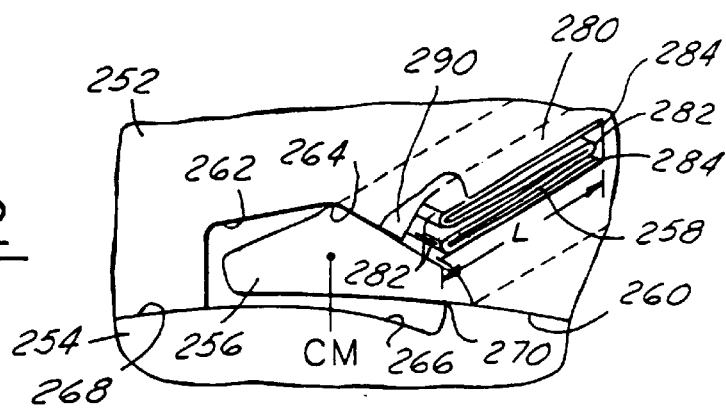

A further preferred embodiment of the invention is shown in FIGS. 30–32 and referred to generally by the reference number 250. This preferred embodiment of a pawl-type one-way clutch mechanism has essentially four parts: a stator member 252, an inner race member 254, a plurality of pawl members 256, and a plurality of spring members 258.

The inside diameter 260 of the stator member 252 is machined to accept the inner race member 254, preferably with a very small clearance (on the order of 0.001–0.005 inches). The stator also has a plurality of pockets 262 formed in the inside diameter to house the pawl members 256. The pawl members and pockets are formed similar to the pawl members and pockets described above, except that the centers of mass (CM) are situated relative to the ridges 264 of the ridges such that the pawl members are biased towards disengagement.

The inner race member 254 has a plurality of notches 266 formed in its outer diameter or surface 268. The notches are formed to provide a plurality of teeth 270 which are used to engage the pawl members and prevent rotation of the stator member 252 in one direction relative to the inner race member 254. The two members 252 and 254 are allowed to rotate freely, i.e. freewheel, in the opposite direction. The inside diameter 272 of the inner race member 254 has a conventional splined configuration to mate with, for example, a stationary support shaft member 274 anchored to a transmission.

The spring members 258 are leaf-spring members formed from folded pieces of spring-type metal material, such as steel. The material is folded into a Z-shaped spring configuration with the lengths 280 of the spring members being positioned in the axial direction of the clutch mechanism and the end folds 282 and free ends 284 of the spring members being positioned at or near the ends of the axial lengths of the pawl members. In this regard, the spring members 258 preferably extend substantially the full length of the pawl members 256 and provide engagement biasing forces uniformly across the pawl members.

The spring members 258 are positioned in recesses or pockets 290 formed in the stator member 252 and which intersect or open into the pawl pockets 262. The recesses 290 have a height "h" sufficient to retain the spring members 258 in a compressed or biased condition so that the springs will provide biasing forces on the pawl members. The recesses 290 have lengths "L" which are substantially the lengths of the pawl members.

In the embodiment shown in FIGS. 30–32, four pawl members and eighteen notches are provided. In the presently preferred embodiment, four pawl members and ten notches are provided. Other numbers of pawl members and notches can also be provided, as stated above, depending on the design of the one-way clutch assembly and its intended use and environment. Preferably, the arrangement and positioning of the pawl members and notches are provided such that two pawl members engage simultaneously to prevent rotation of the clutch mechanism.

The pockets 262 can be machined in the stator member 252 by a milling or broaching operation, as desired. The pockets also could be formed in the stator when it is cast. Preferably, a casting operation could provide the precise size and dimensions of the pockets to eliminate the need to finish machine them to a final dimension.

In the preferred embodiment shown in FIGS. 30–32, the inner race can be provided of a steel material, as is conventionally known. However, the outer member is preferably made of non-ferrous material, such as aluminum or a plastic material. These materials are lighter in weight than steel and preferably should be provided with sufficient strength and durability to meet the specifications and required performance of the one-way clutch mechanism. The spring member and pawl members can be provided of any conventional materials used with present one-way clutch mechanisms, such as steel.

Although an aluminum metal material is preferred for the stator member, other non-ferrous metal materials could be utilized. These include titanium, zinc, nickel and superalloys commonly used in high temperature engine applications, such as gas turbine engines.

Plastic materials which could be utilized for the stator members 252 preferably include any materials used in high heat and high stress applications today. The materials should have high tensile and flexural strength and should have structural integrity in the presence of hydraulic fluids or other fluids commonly used in vehicle or engine transmission systems.

Both thermosetting and thermoplastic materials may be considered. Polymers such as polypropylene, polyethylene (high density preferred), nylon and polyvinylchloride (high molecular weight preferred) can be considered as suitable plastic materials. One of ordinary skill in the art will readily appreciate that various design parameters may be adjusted by the addition of plasticizers, heat stabilizers, fillers, lubricants, and the like to the polymer. The plastic materials can also be reinforced with glass fibers or the like. Finally, as disclosed in U.S. Pat. No. 5,121,686, the disclosure of which is herein incorporated by reference, phenolic resin plastics, also known by the tradename Duroplast, are used in the manufacture of automotive clutch assemblies and are also suitable for the manufacture of the stator members described herein.

In order to insure that the forces acting on the pawls due to engagement of the clutch mechanism, and thus the forces applied to the pocket walls in the stator members, do not damage the pockets or stator members, it is possible to provide inserts of a harder material in each of the pockets. Thus, insert members of the type described above with reference to FIGS. 24–26 could be provided. Similarly, the walls of the pockets could be lined with a harder coating or material, such as shown by dashed line 292 in FIG. 31.

In the preferred embodiments utilizing non-ferrous stator members, it is also possible to utilize other spring members as mechanisms to bias the pawl members toward engagement, i.e. as alternatives to the Z-shaped leaf spring members shown in FIGS. 30–32. For this purpose, one or more garter spring members could be utilized, such as shown above in FIGS. 3–7. With such spring members, corresponding pawl members with recesses, such as shown in FIGS. 8–10, would also be utilized.

While the best modes for carrying out the present invention have been described in detail herein, those familiar with the art to which this invention relates will recognize various alternate designs and embodiments for practicing the invention as defined by the following claims. All of these embodiments and variations that come within the scope and meaning of the present claims are included within the scope of the present invention.

What is claimed is:

1. A one-way ratchet clutch mechanism comprising:
 a stator member having a plurality of pockets, said stator member being made from a non-ferrous material;
 an inner race member having a plurality of notches;
 a plurality of pawl members, one of said pawl members positioned in each of said pockets; and Z-shaped spring members positioned in operative engagement with each of said pawl members for biasing said pawl members towards engagement with said notches;

said pawl members each having a ridge thereon and said pockets each having a corresponding recess for mating with said ridge.

2. The one-way ratchet clutch mechanism of claim 1 wherein four of said pawl members and eighteen of said notches are provided.

3. The one-way ratchet clutch mechanism of claim 1 wherein said pawl members each have a center of mass positioned relative to said ridge such that upon rotation of said outer member, the pawl members are moved toward disengagement with said notches in said inner race member.

4. The one-way ratchet clutch assembly of claim 1 wherein said Z-shaped spring members are positioned in recesses in said stator member and have widths positioned in alignment with the axial direction of said stator mechanism.

5. The one-way ratchet clutch mechanism of claim 1 further comprising protector means in each of said pockets.

6. The one-way ratchet clutch mechanism of claim 5 wherein said protector means comprises an insert member.

7. The one-way ratchet clutch mechanism of claim 5 wherein said protector means comprises a hard coating material.

8. The one-way ratchet clutch mechanism of claim 1 wherein said stator member is made from an aluminum material.

9. The one-way ratchet clutch mechanism of claim 1 wherein said stator member is made from a plastic material.

10. A one-way ratchet clutch mechanism comprising:

a stator member having a plurality of pockets, said stator member being made from a non-ferrous material;

an inner race member having a plurality of notches;

a plurality of pawl members, one of said pawl members positioned in each of said pockets; and a plurality of Z-shaped spring members, one of said Z-shaped spring members biasing each of said pawl members towards engagement with said notches.

11. The one-way ratchet clutch assembly of claim 10 wherein said Z-shaped spring members are positioned with their width in said axial direction of said stator member.

12. The one-way ratchet clutch assembly of claim 10 wherein four pawl members and eighteen notches are provided.

13. A one-way ratchet clutch mechanism comprising:

a stator member being made of a non-ferrous material and having a plurality of pockets;

an inner race member having a plurality of notches;

a plurality of pawl members, one of said pawl members being positioned freely in each of said pockets;

said pawl members being retained in said pockets during rotation of said stator member in one direction relative to said inner race member, and at least one of said pawl members being engaged with one of said notches when said stator member is rotated relative to said inner race member in the opposite direction;

means for directing said pawl members toward disengagement with said notches, said means comprising a ridge member on each of said pawl members, a corresponding mating recess member in each of said pockets, and a configuration of each of said pawl members which positions the center of mass thereof relative to said ridge member such that centrifugal force causes the pawl member to move toward the disengaged position; and Z-shaped biasing means for biasing said pawl members toward said engaged position.

14. The one-way ratchet clutch mechanism of claim 13 further comprising annular disc members positioned on opposite sides of said clutch assembly, wherein said disc members assist in axially retaining the pawl members in said pockets.

15. The one-way ratchet clutch mechanism as set forth in claim 1 wherein the center of mass of each of said pawl members relative to said ridge causes the pawl members to move toward the disengaged position.

16. The one-way ratchet clutch mechanism as set forth in claim 1 wherein said non-ferrous material is aluminum and four of said pawl members and ten of said notches are provided.

17. The one-way ratchet clutch mechanism as set forth in claim 10 wherein said non-ferrous material is aluminum.

18. The one-way ratchet clutch mechanism as set forth in claim 13 wherein said non-ferrous material is aluminum and at least three pawl members and at least ten notches are provided.

19. The one-way ratchet clutch mechanism as set forth in claim 13 wherein said Z-shaped biasing means are positioned with widths in the axial direction of said stator member.

* * * * *